United States Patent
Nyrhilä et al.

(10) Patent No.: US 10,682,700 B2
(45) Date of Patent: Jun. 16, 2020

(54) DEVICE AND METHOD FOR PRODUCING A THREE-DIMENSIONAL OBJECT LAYER-BY-LAYER

(71) Applicant: EOS GmbH Electro Optical Systems, Krailling (DE)

(72) Inventors: Olli Nyrhilä, Kuusisto (FI); Alexander Schilling, München (DE); Jörg Hamann, Ingolstadt (DE); Robert Achim Domröse, Germering (DE); Dominik Wolf, München (DE); Tatu Syvänen, Preitilä (FI); Kevin Minet, Turku (FI)

(73) Assignee: EOS GmbH Electro Optical Systems, Krailling (DE)

( * ) Notice: Subject to any disclaimer, the term of this patent is extended or adjusted under 35 U.S.C. 154(b) by 473 days.

(21) Appl. No.: 15/129,333

(22) PCT Filed: Mar. 27, 2015

(86) PCT No.: PCT/EP2015/056722
§ 371 (c)(1),
(2) Date: Sep. 26, 2016

(87) PCT Pub. No.: WO2015/144884
PCT Pub. Date: Oct. 1, 2015

(65) Prior Publication Data
US 2017/0216916 A1   Aug. 3, 2017

(30) Foreign Application Priority Data

Mar. 28, 2014   (DE) ........................ 10 2014 205 875

(51) Int. Cl.
*B22F 3/105*   (2006.01)
*B29C 64/153*   (2017.01)
(Continued)

(52) U.S. Cl.
CPC .......... *B22F 3/1055* (2013.01); *B23K 26/144* (2015.10); *B23K 26/1476* (2013.01);
(Continued)

(58) Field of Classification Search
CPC ................ B22F 3/1055; B22F 2998/10; B22F 2003/1057; B29C 64/386; B29C 64/153;
(Continued)

(56) References Cited

U.S. PATENT DOCUMENTS 5,981,897 A   11/1999   Offer et al.
6,098,895 A   8/2000   Walzel et al.
(Continued)

FOREIGN PATENT DOCUMENTS

DE   4308842 A1   9/1994
DE   19649865 C1   2/1998
(Continued)

OTHER PUBLICATIONS

International PCT Preliminary Report on Patentability and Written Opinoin, dated Oct. 4, 2016; with English Translation; 12 pages.
(Continued)

*Primary Examiner* — Michael M. Robinson
(74) *Attorney, Agent, or Firm* — Seyfarth Shaw LLP (57) ABSTRACT

A device is disclosed for producing a three-dimensional object by layerwise construction. The device contains a flow device for generating a gas flow above an applied layer of the building material by means of a nozzle element for introducing the gas into the device. The nozzle element includes a body with a gas inlet side and a gas outlet side, and channels which penetrate the body from the gas inlet side to the gas outlet side, provided with inlet openings on the gas inlet side and gas outlet openings on the gas outlet
(Continued)

side, and which are separated by walls. The length of the channels is selected such that a laminar flow is formed at the gas outlet side.

14 Claims, 5 Drawing Sheets (51) Int. Cl.
| | |
|---|---|
| *B29C 64/35* | (2017.01) |
| *B29C 64/20* | (2017.01) |
| *B29C 64/386* | (2017.01) |
| *B33Y 10/00* | (2015.01) |
| *B33Y 30/00* | (2015.01) |
| *B33Y 40/00* | (2020.01) |
| *B33Y 50/02* | (2015.01) |
| *B23K 26/144* | (2014.01) |
| *B23K 26/342* | (2014.01) |
| *B23K 26/14* | (2014.01) |
| *B28B 1/00* | (2006.01) |
| *B28B 17/00* | (2006.01) |
| *B29C 64/165* | (2017.01) |
| *B29K 105/00* | (2006.01) |

(52) U.S. Cl.
CPC ............ *B23K 26/342* (2015.10); *B28B 1/001* (2013.01); *B28B 17/0081* (2013.01); *B29C 64/153* (2017.08); *B29C 64/20* (2017.08); *B29C 64/35* (2017.08); *B29C 64/386* (2017.08); *B33Y 10/00* (2014.12); *B33Y 30/00* (2014.12); *B33Y 40/00* (2014.12); *B33Y 50/02* (2014.12); B22F 2003/1057 (2013.01); B22F 2998/10 (2013.01); B29C 64/165 (2017.08); B29K 2105/251 (2013.01)

(58) Field of Classification Search
CPC ....... B29C 64/35; B29C 64/20; B29C 64/165; B33Y 50/02; B33Y 30/00; B33Y 40/00; B33Y 10/00; B28B 17/0081; B28B 1/001; B23K 26/144; B23K 26/342; B23K 26/1476; B29K 2105/251
See application file for complete search history.

(56) References Cited

U.S. PATENT DOCUMENTS

| | | |
|---|---|---|
| 6,215,093 B1 | 4/2001 | Meiners et al. |
| 6,583,379 B1 | 6/2003 | Meiners et al. |
| 2005/0042152 A1* | 2/2005 | Gardner ................. B01J 19/121 |
| | | 422/186.3 |
| 2005/0116391 A1 | 6/2005 | Lindemann et al. |
| 2008/0192104 A1* | 8/2008 | Nye ........................ B41J 3/4073 |
| | | 347/110 |
| 2009/0266803 A1* | 10/2009 | Perret ................... B22F 3/1055 |
| | | 219/121.85 |
| 2016/0001401 A1* | 1/2016 | Dimter .................. B22F 3/1055 |
| | | 219/76.12 |

FOREIGN PATENT DOCUMENTS

| | | |
|---|---|---|
| DE | 19853947 C1 | 2/2000 |
| EP | 1514622 A1 | 3/2005 |
| EP | 2492084 A1 | 8/2012 |
| EP | 2647942 A1 | 10/2013 |
| WO | 03/086617 A1 | 10/2003 |
| WO | 2007/112808 A1 | 10/2007 |
| WO | 2014125280 A2 | 8/2014 |

OTHER PUBLICATIONS

Ferrar et al., Gas flow effects on selective laser melting (SLM) manufacturing performance, Journal of Materials Processing Technology, 212, 2012, pp. 355-364 (English).

* cited by examiner

0
DEVICE AND METHOD FOR PRODUCING A THREE-DIMENSIONAL OBJECT LAYER-BY-LAYER

TECHNICAL FIELD OF THE INVENTION

The present invention relates to a device and method for producing a three-dimensional object layer-by-layer, by solidifying, layer-by-layer, building material at locations in the respective layer corresponding to the cross-section of the object to be produced.

BACKGROUND OF THE INVENTION

The methods for producing a three-dimensional object layer-by-layer include, for example, selective laser sintering or melting. Here a powder-form building material is applied layer-by-layer and selectively solidified by means of laser radiation.

DE 196 49 865 C1 describes a method for producing a shaped body by layer-by-layer application and selective solidification of a metallic material powder in a process chamber. A protective gas inlet is arranged on one side of the process chamber, and on the other side a protective gas outlet. By means of these a laminar protective gas flow is generated over the applied powder in order to avoid oxidation of the surface of the materials.

DE 198 53 947 C1 describes a process chamber for the selective laser melting; in its sidewalls are arranged inlet and outlet openings for a protective gas which flows through the process chamber.

In both cases, the layer-by-layer application of the powder takes place by means of a slider, from a powder supply located upstream with respect to the protective gas flow. The powder supply and the working surface for constructing the object are located side-by-side, and accordingly the process chamber is flat and long. The protective gas flow must flow through more than half of the process chamber before it reaches the applied powder layer, as a result of which it is easy to achieve a protective gas flow that is laminar over the applied powder layer.

In devices for producing a three-dimensional object layer-by-layer, in which application of a powder layer is executed in another manner, for example from a powder supply arranged above the working surface, no such long run-in section is available for a gas flow. Here the gas flow essentially flows only across the working surface on which the object is being constructed. As a result, it is more difficult to ensure that the gas flow over the whole of the applied powder layer is laminar.

In the case of a device internally known to the applicant, a gas is guided via a channel to a sidewall of the process chamber, and is introduced into the process chamber through a perforated plate that contains a plurality of holes located side-by-side. On the other side the gas is sucked out once again. Here guide plates upstream of the perforated plate can help to improve the laminar state of the gas flow. Nevertheless a gas flow generated in this manner has irregularities and turbulences.

By the introduction of energy onto the powder that is to be solidified, spatters, smoke, gases and/or vapours can occur on the powder surface which can cause an absorption or diffraction of the laser beam. The local illumination defects that thereby result can have a negative effect on the quality of the object to be produced.

The irregularities and turbulences occurring in the device internally known to the applicant lead to a non-homogeneous removal of the smoke, gases, and/or vapours that are formed on the powder surface. By virtue of the illumination defects resulting therefrom, and as a result of turbulence occurring in the protective gas flow which can cause the powder that is to be solidified to swirl up, the quality of the object to be produced can be impaired.

SUMMARY OF THE INVENTION

The object of the present invention consists in the provision of a device and method for producing a three-dimensional object layer-by-layer, by the layer-by-layer application and selective solidification of a building material, in which the laminar state of a gas flow guided over an applied layer of the building material is improved.

The object is achieved by means of a device in accordance with claim 1, a method in accordance with claim 10, a nozzle element in accordance with claim 11, a flow device in accordance with claim 14, and a usage of the nozzle element in accordance with claim 15. Further developments of the invention are specified in each of the dependent claims. At the same time the method can also be developed further by means of the features of the device located below, or of its dependent claims, or vice versa.

In that the nozzle element specified in these claims is used for purposes of generating a laminar flow, the laminar state of a gas flow guided over an applied layer of the building material is improved, as is thereby the quality of the object produced. Moreover, with the aid of the nozzle element the implementation of a laminar flow of the gas flow can be enabled within a build space with relatively small dimensions, in particular the dimensions along the direction of the laminar gas flow that is to be achieved.

The horizontal width of the channels preferably increases gradually from the gas inlet side of the nozzle element to the gas outlet side. The fanning-out of the airflow thereby caused leads to the fact that the same working area can be covered with a narrower nozzle element.

The nozzle element preferably contains a fin directed in a sloping manner downwards, above the channels of the lower row or rows. The downward direction of the airflow exiting from the lower outlet openings thereby caused leads furthermore on to the fact that the turbulence in the gas flow occurring on the gas outlet side of the nozzle element is limited to a significantly smaller region, and that a laminar flow is already achieved at a significantly shorter distance from the nozzle element.

Further features and practicalities of the invention ensue from the description of examples of embodiment with the aid of the accompanying figures.

DETAILED DESCRIPTION OF THE EMBODIMENTS

Figure 1:
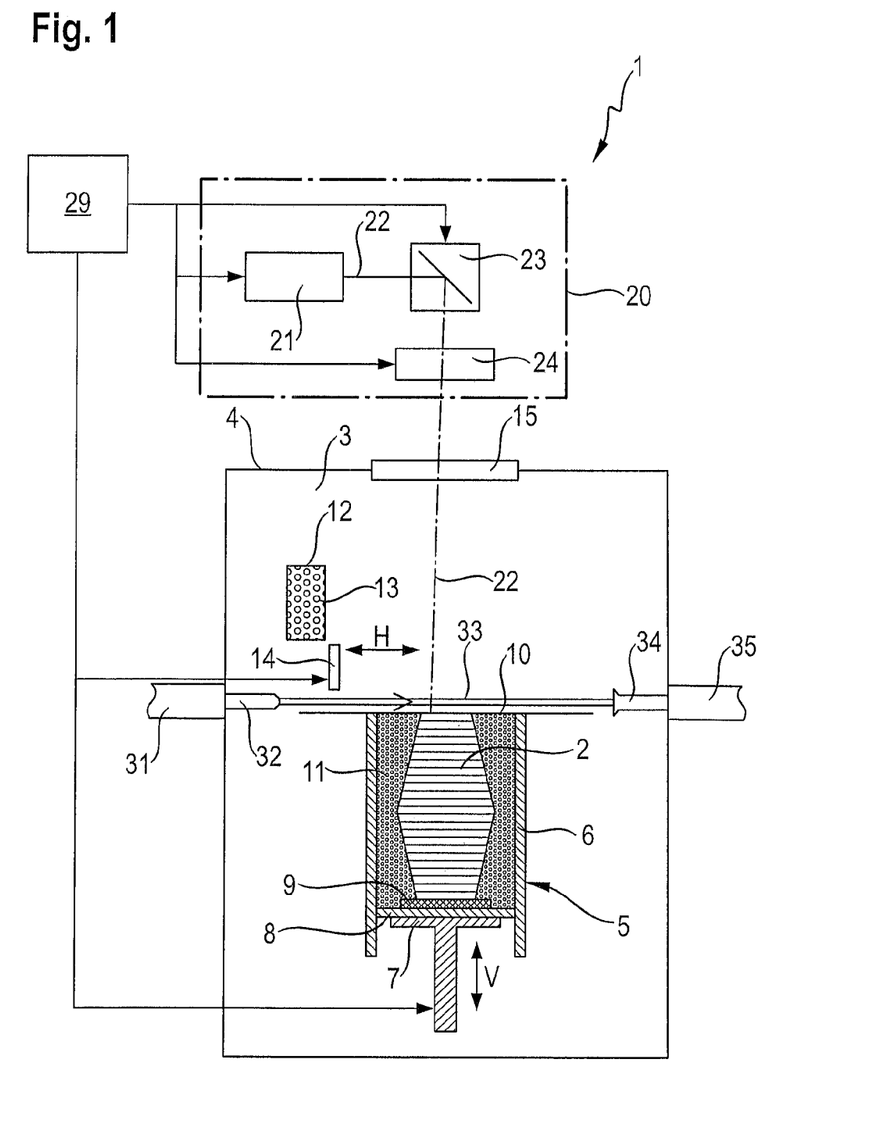
FIG. 1 is a schematic view, represented partly in cross-section, of a device for the production of a three-dimensional object layer-by-layer in accordance with the present invention.

In what follows an example of a device in accordance with a first embodiment of the present invention is described with reference to FIGS. 1 to 5. The device represented in FIG. 1 is a laser sintering device or laser melting device 1. For purposes of constructing an object 2 it contains a process chamber 3 with a chamber wall 4.

In the process chamber 3 a container 5 is arranged open upwards with a wall 6. In the container 5 is arranged a support 7 that can be moved in a vertical direction V, onto which a base plate 8 is fitted which closes off the container in the downwards direction, and thereby forms its floor. The base plate 8 can be a plate that is formed separately from the support 7 and which is attached to the support 7, or it can be formed integrally with the support 7. Depending upon the powder and process that is being used, a build platform 9 can also be fitted onto the base plate 8, on which the object 2 is constructed. However, the object 2 can also be constructed on the base plate 8 itself which then serves as a build platform. In FIG. 1 the object 2 that is to be built in the container 5 on the build platform 9 is represented underneath a working plane 10 in an intermediate state with a plurality of solidified layers, surrounded by building material 11 that remains non-solidified.

The laser sintering device 1 furthermore contains a supply container 12 for a powder-form building material that can be solidified by means of electromagnetic radiation, and an application device 14 that can be moved in a horizontal direction H for purposes of applying the building material 13 onto the working plane 10. On its upper face the wall 4 of the process chamber 3 contains a coupling window 15 for the radiation serving to solidify the powder 13.

The laser sintering device 1 furthermore contains an illumination device 20 with a laser 21 which generates a laser beam 22 which is deflected via a deflection device 23 and focused by means of a focusing device 24 via the coupling window 15 onto the working plane 10.

Furthermore, the laser sintering device 1 contains a control unit 29, via which the individual components of the device 1 are controlled in a coordinated manner, for purposes of executing the build process. The control unit can contain a CPU, the operation of which is controlled by means of a computer program (software).

For purposes of generating a laminar gas flow 33 above the working plane 10, the laser sintering device 1 furthermore contains a gas supply channel 31, a gas inlet nozzle 32, a gas outlet nozzle 34, and a gas removal channel 35. The gas supply and removal can also be controlled by the control unit 29.

Figure 2:
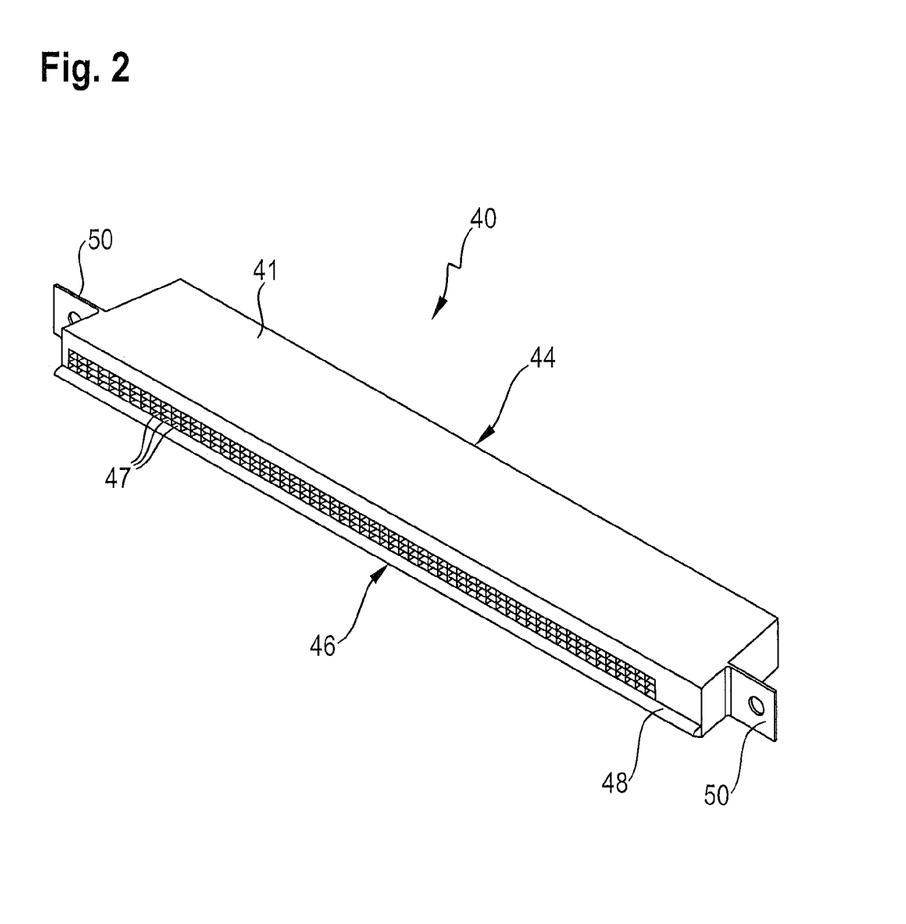
FIG. 2 is a perspective view of a nozzle element used as a gas inlet nozzle in the device shown in FIG. 1, in accordance with a first embodiment of the present invention.
Figure 3:
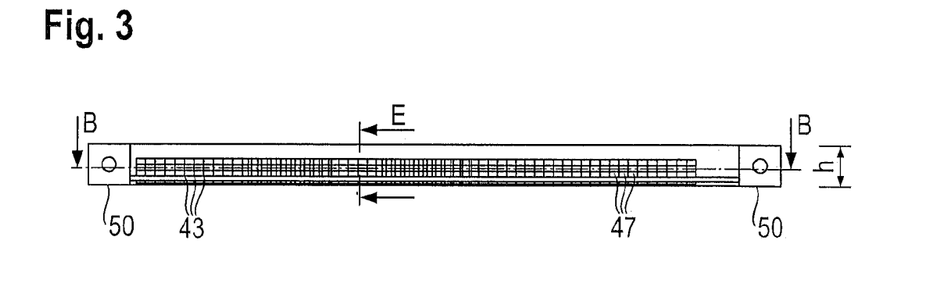
FIG. 3 is a side view onto a gas outlet side of the nozzle element shown in FIG. 2.
Figure 4:
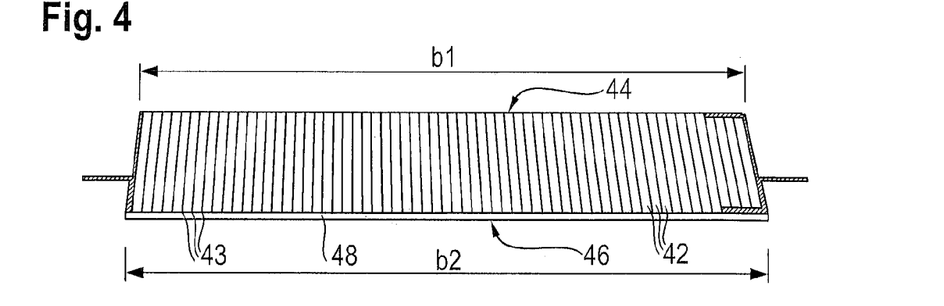
FIG. 4 is a cross-sectional view of the nozzle element shown in FIGS. 2 and 3 along a line B-B shown in FIG. 3.
Figure 5:
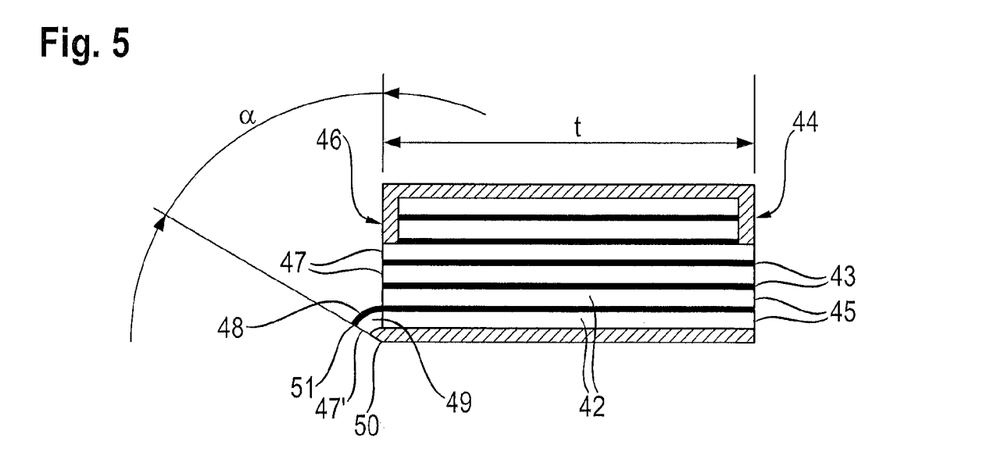
FIG. 5 is a cross-sectional view of the nozzle element shown in FIGS. 2 to 4 along a line E-E shown in FIG. 3.

A nozzle element 40 is provided as the gas inlet nozzle 32; this is represented in FIG. 2 in a perspective view. FIG. 3 shows a side view onto a gas outlet side 46 of the nozzle element 40, and FIGS. 4 and 5 show in each case cross-sectional views of the nozzle element 40.

The nozzle element 40 comprises a body 41 of a solid material through which channels 42 which are separated from one another by walls 43 run located side-by-side and one-above-another. On the gas inlet side 44 of the nozzle element 40 the channels 42 terminate in inlet openings 45, on the gas outlet side 46 in outlet openings 47. In the present application a path for a gas flow is designated as a channel which preferably is surrounded by a wall closed on all sides essentially over its whole length between its inlet opening and its outlet opening, so that essentially no transfer of gas from one channel into an adjacent channel can take place.

In accordance with the present embodiment the body 41 is formed so as to be approximately rectangular with a height h and a depth t. As can best be seen in FIG. 4, the base plan is, however, slightly trapezoidal, so that the width b1 at the gas inlet side 44 is smaller than the width b2 at the gas outlet side 46. Correspondingly the cross-section of the individual channels 42 widens in the horizontal direction from the gas inlet side 44 to the gas outlet side 46. The width b2 on the gas outlet side 46 is dimensioned such that the gas flow 33 generated can cover the whole build field, i.e. the working plane 10.

In the present embodiment the channels 42 in each case have a rectangular cross-section, in which the width of the individual channels is greater than their height, and they are arranged in the form of a matrix in rows and columns side-by-side, and one-above-another. The walls 43 located between them form in the side view shown in FIG. 3 (and in each cross-section located parallel to the plane of the drawing in FIG. 3) a grid of horizontal and vertical lines. The total cross-sectional area of all these walls 43 in the side view (or in a corresponding cross-sectional view) is significantly smaller than the total cross-sectional area of all channels 42.

The depth t of the body 41, and thus the length of the channels 42, is selected such that a laminar flow is formed therein, and the gas outlet on the gas outlet side 46 takes place in a laminar manner. In this application the term "laminar" is used for a gas flow 3 which is either completely laminar, or is at least essentially laminar, such that it only contains turbulences to a small extent, such that it does not prevent the removal of smoke, gases and/or vapours, and does not swirl up the applied powder layer, or move it in any other manner.

The channel length is preferably selected to be longer than the largest dimension of the outlet openings 47. In the rectangular cross-section used in the present embodiment the largest dimension of the outlet openings 47 is the diagonal of the rectangle. The channel length is preferably five times as large as the largest dimension of the outlet openings, in a more preferred manner it is at least ten times as large.

As can best be seen in FIG. 5, the nozzle element 40 furthermore contains a fin 48 above the lowermost row of outlet openings 47 which projects from the gas outlet side 44 of the body 41, and is inclined in the direction of the working plane 10, and which here extends over the whole width b2 of the gas outlet side 44 of the body 41. The thickness of the fin 48 corresponds approximately to the thickness of the wall between the lowermost row and the second lowest row of outlet openings. In its cross-section the fin 48 can be formed so as to be straight, or slightly curved downwards. Furthermore, the walls between adjacent channels 42 of the lowermost row are extended in each case by a projection 49, such that the lower edge 50 of the outlet openings 47 is connected with the lower edge 51 of the fin 48. Thus sloping outlet openings 47' ensue for the lower row which are inclined downwards relative to the other outlet openings 47 by an angle α, and thus deflect the airflow slightly downwards. This angle α is preferably greater than or equal to 45°, in a more preferred manner it is greater than or equal to 55°. Independently of this, the angle α is preferably less than or equal to 75°, in a more preferred manner it is less than or equal to 65°. In an even more preferred manner it is approximately 60°.

Finally, the nozzle element 40 contains on both sides an attachment tab 50 for purposes of attachment onto a retention device (not shown), or onto the chamber wall 4 of the process chamber 5.

In operation, for purposes of applying a powder layer, the support 7 is firstly lowered by a height that corresponds to the desired layer thickness. Using the application device 14, a layer of the powder-form building material 13 is now applied. The application takes place at least over the total cross-section of the object 2 to be produced, preferably over the whole build field. The cross-section of the object 2 to be produced is then scanned by the laser beam 22, such that the powder-form building material 13 is solidified at these locations. These steps are repeated until the object 2 is completed, and can be taken out of the build space.

During the construction of the object 2 the gas flow 33 is guided over the working plane 10. This gas flow 33 ensures that smoke, gases, and/or vapours which are formed on the powder surface, can be removed.

As a result of the described expansion of the cross-section of the channels 42 in the horizontal direction, from the gas inlet side 44 to the gas outlet side 46, a fanning-out of the gas flow 33 is achieved. By this means the gas flow 33 can flow over a larger region than that which corresponds to the width b2 of the part of the body in which the outlet openings 47 are arranged. Furthermore, edge effects at the edge of the laminar flow can be reduced.

Figure 6:
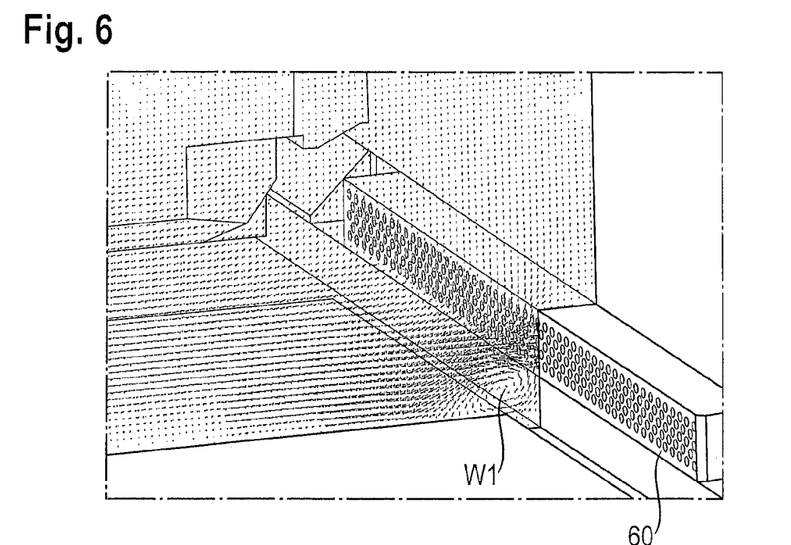
FIG. 6 is a perspective view that shows simulation results for a gas flow when using a perforated plate as a gas inlet nozzle in accordance with a comparative example.
Figure 7:
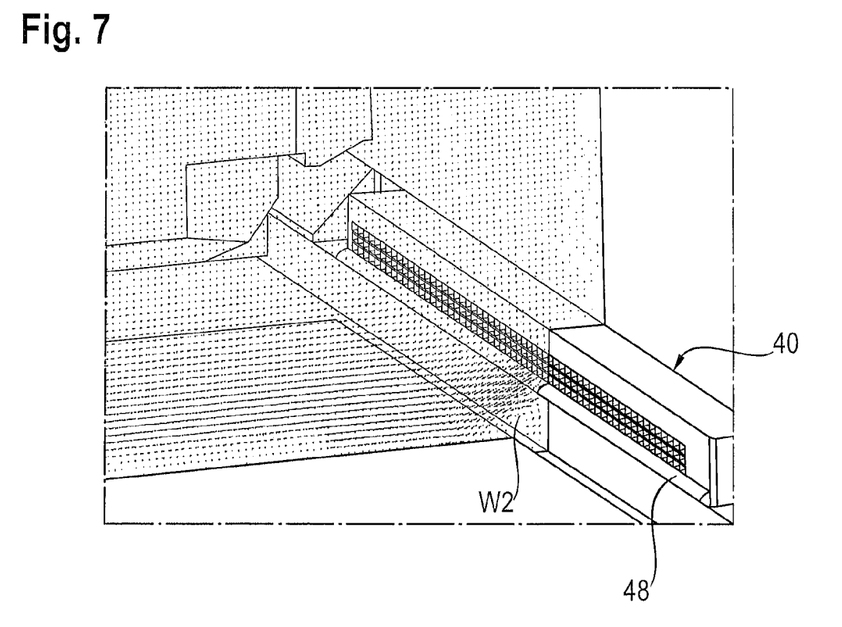
FIG. 7 is a perspective view that shows simulation results for a gas flow when using the nozzle element shown in FIGS. 2 to 5 as a gas inlet nozzle.

FIGS. 6 and 7 each show simulation results for a gas flow when using a perforated plate 60 as a comparative example, and when using the nozzle element 40 of the present embodiment as a gas inlet nozzle.

With the use of the perforated plate 60 the air supply takes place between two parallel plates, between which connecting fins are arranged which, however, do not form any continuously closed channels between the inlet side and the outlet side. As can be seen from FIG. 6, when using a perforated plate in accordance with the prior art a strong turbulence W1 occurs underneath the lower row of holes.

In contrast FIG. 7 shows that when using the nozzle element 40 the turbulence W2 is significantly smaller, and that a laminar gas flow is already achieved at a shorter distance from the outlet openings 47.

Smoke, gases, and/or vapours which are formed on the powder surface, can be removed by the gas flow 33, without the layer of the applied powder being impaired by turbulences. In particular the direction of the gas flow 33 downwards out of the lower outlet openings 47', as a result of the fin 48 and the projections 49 of the walls between the channels 42 of the lower row, leads to the fact that a turbulence W2 of the gas flow occurring at the gas outlet side 46 is limited to a smaller region, and that a laminar flow is achieved on the working plane 10 at a shorter distance from the nozzle element 40.

The laminar state of the gas flow 33, improved as a result of the nozzle element 40, ensures that in the removal of the waste products formed on the surface of the powder no irregularities or turbulences arise which could disturb the illumination, and could thus impair the quality of the object 2 produced. The objects 2 produced therefore have better properties, e.g. fewer and smaller pores, predictable and fewer deviations in the mechanical properties, etc.

Thus, by the use of the nozzle element 40 described in this embodiment for purposes of generating a laminar gas flow 33, the effect is achieved of improving the quality of the objects 2 produced.

In order to adapt the nozzle element 40 to various applications (e.g. various layer thicknesses, various grain sizes of the power used) a proportion of the inlet openings 44, and/or the outlet openings 45 can be covered. This can take place manually with the application of adhesive tape, or by covering the openings with a cover and/or a slider as a screening device. A slider serving the purpose of covering can, however, also be moved by a motor which in turn can be controlled by the control unit 29. By means of such a partial covering of the inlet openings 44 and/or the outlet openings 45 the flow rate of the gas can be controlled.

Although in the case of the above-described embodiment the channels 42 have a rectangular cross-section and are arranged in the form of a matrix in rows and columns, the present invention is not limited to this. The cross-section of the channels 42 can also be circular, triangular or hexagonal in form, or can have any other kind of curved and/or polygonal edge. Rows of channels located one-above-another can also be displaced laterally relative to one another; rows of channels located side-by-side can be displaced in height relative to one another, or the channels can be arranged in any other format relative to one another.

Although in the case of the above-described embodiment the horizontal width of the channels 42 increases gradually from the gas inlet side 44 of the nozzle element 40 to the gas outlet side 40, the width can also remain constant, or reduce.

The vertical height of the channels 42 can also increase gradually from the gas inlet side 44 of the nozzle element 40 to the gas outlet side 40, or it can also reduce, or remain constant. Also it is not necessary for all channels to have the same cross-section and/or the same spacing.

The walls between the channels do not have to be fixed, but rather can also be designed as fins that are able to move.

Although in the case of the above-described form embodiment the channels run linearly from the gas inlet side to the gas outlet side, the present invention is not limited to this. In a second embodiment the gas inlet side is inclined relative to the gas outlet side by 90°.

Figure 8:
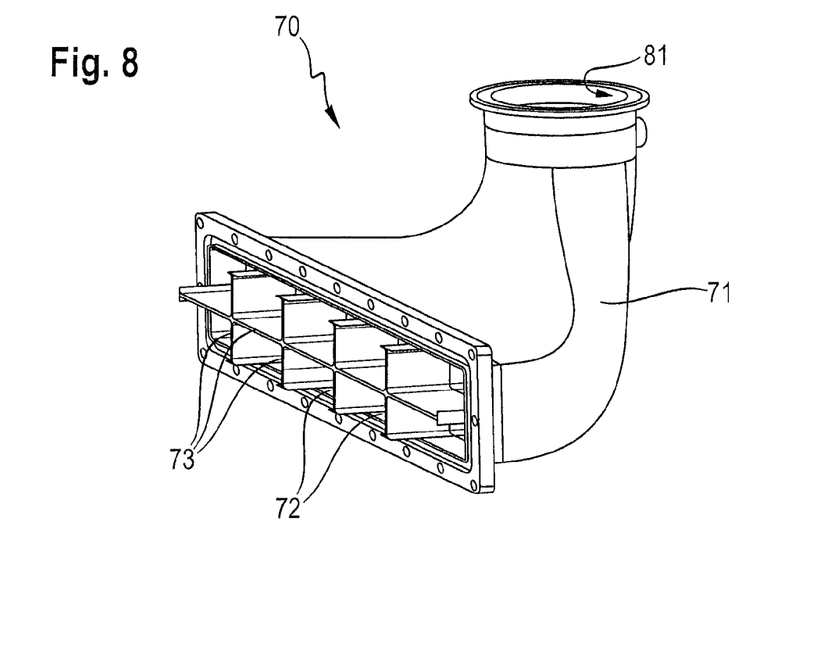
FIG. 8 is a perspective view of a nozzle element used as a gas inlet nozzle in the device shown in FIG. 1, in accordance with a second embodiment of the present invention.
Figure 9:
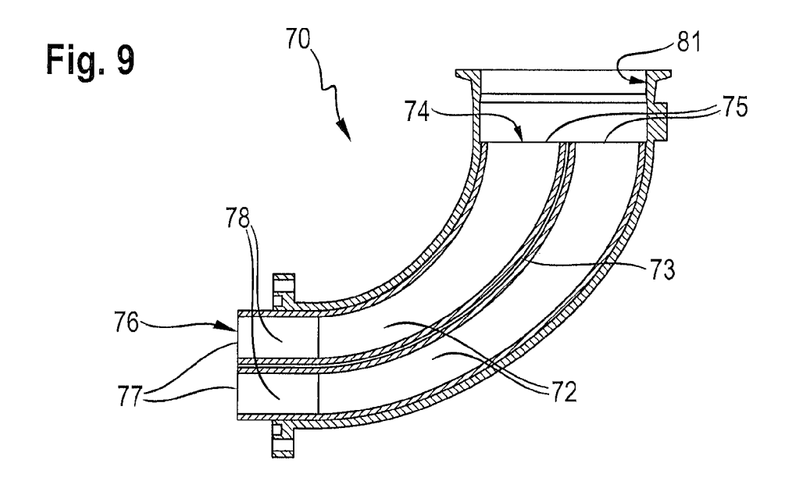
FIG. 9 is a cross-sectional view of the nozzle element shown in FIG. 8 in its central plane.

FIG. 8 shows a perspective view of a nozzle element 70 of the second embodiment, and FIG. 9 shows a cross-sectional view of the nozzle element shown in FIG. 8 in its central plane.

The nozzle element 70 comprises a body 71 which on its gas inlet side 74 has an opening 81 for purposes of connecting a gas supply.

As in the case of the nozzle element 40, channels 72 which are separated by walls 73 from one another, also run through the nozzle element 70 from the gas inlet side 74 to the gas outlet side 76. On the gas inlet side 74 the channels 72 terminate in inlet openings 75, on the gas outlet side 76 in outlet openings 77.

In a manner contrary to the nozzle element 40, however, the channels are curved so as to deflect the direction of the gas supplied from above into the horizontal direction. On the gas outlet side 76, however, each channel 72 has an end section 78 running linearly in the horizontal direction, the length of which is selected such that a laminar flow forms therein, and the outlet of gas on the gas outlet side 76 takes place in a laminar manner.

Further features and variations of the second embodiment are the same as in the case of the first embodiment.

Although the present invention has been described with the aid of a laser sintering or laser melting device, it is not limited to laser sintering or laser melting. It can be applied to any method for the production of a three-dimensional object by the layer-by-layer application and selective solidification of a building material, in which a gas flow, in particular, a protective gas flow, is used. The laser can, for example, comprise a gas laser, or a solid body laser, or a laser diode. A line illuminator can also be used which contains, for example, an array of laser diodes. In general, any device can be used with which energy can be selectively applied onto a layer of the building material. Instead of a laser, another light source, for example an electron beam, or any other energy or radiation source which is suitable for solidifying the building material can be used. The invention can also be applied to selective mask sintering, in which an extended light source and a mask are used, or to absorption or inhibition sintering.

Instead of the introduction of energy, the selective solidification of the applied building material can, for example, also take place by means of the application of an adhesive. In general, the invention relates to the production of an object by means of a layer-by-layer application and selective solidification of a building material independently of the manner in which the building material is solidified, for example, it relates also to 3-D printing.

A protective gas is preferably used as the gas, which essentially does not enter into any chemical reaction with the building material; depending upon the building material used this can be, for example, nitrogen or argon.

When using a powder as the building material, various types of powder can be used, in particular metal powder, plastic powder, ceramic powder, sand, filled or mixed powder.

The invention claimed is:

1. A device for producing a three-dimensional object by solidifying, layer-by-layer, building material at locations in a respective layer corresponding to the cross-section of the object to be produced, the device comprising: a base on which the object is to be constructed, the base being on a vertically movable support within a build chamber; a supply of building material;
   an application device which receives building material from the supply and applies a layer of the building material onto the base in consecutive layers for selectively solidifying the building material layer by layer in a working plane of a build surface in the build chamber;
   a solidifying device for purposes of selective solidification of the building material in an applied layer; a flow device generating a gas flow from a side of the build surface across an applied layer of the building material to an opposite side of the build surface;
   a source of gas for the flow device, the flow device having a nozzle from which the gas exits to flow across the build surface, and the nozzle having an elongated nozzle body extending in a length along to a side of the build area surface and a height perpendicular to the side, the body having a gas inlet side and a gas outlet side, the body being mounted adjacent a side of the build surface; and a plurality of separated gas channels which extend through the nozzle body from the gas inlet side to the gas outlet side, the gas channels having respective inlet openings on the gas inlet side and respective gas outlet openings on the gas outlet side, the gas channels having a length within the nozzle body and an outlet opening designed and dimensioned such that collectively the gas channels and the outlet openings yield a laminar gas flow that is formed in the nozzle which then is directed as a generally laminar gas flow across the build surface in at least a vicinity of the nozzle gas outlet side, the gas channels presenting outlet openings arranged in a matrix of at least two rows, with a first row extending along the length parallel to the side of the build surface and a second row arranged above the first row along the height perpendicular to the side of the build surface,
   wherein a cross-sectional area of the channels increases gradually from the gas inlet side to the gas outlet side.

2. The device according to claim 1, wherein the length of the channels is greater than a largest dimension of the outlet openings of the channels located on the gas outlet side of the nozzle body.

3. The device according to claim 1, wherein a gas outlet deflecting fin is formed above the outlet openings across at least one row of adjacent channels which are located on and extend across the length of the nozzle body on the side of the nozzle element facing towards the working plane, the fin pointing away from the gas outlet side of the nozzle body, and downwardly in the direction of the build surface.

4. The device according to claim 3, wherein walls between adjacent channels of a row of channels positioned under the fin have in each case a projection extending out from the gas outlet side of the nozzle body, which connects a lower edge of the outlet openings of the row positioned under the fin with a lower edge of the fin, so that sloping outlet openings are formed which are inclined relative to the other outlet openings by an angle.

5. The device according to claim 4, wherein the angle is greater than or equal to 45°, and the angle is less than or equal to 75°.

6. The device according to claim 4, wherein the angle is greater than or equal to 55°, and the angle is less than or equal to 65°.

7. The device according to claim 4, wherein the angle is 60°.

8. The device according to claim 1, wherein the gas channels are parallel.

9. The device according to claim 1, wherein at least one part of the walls is formed as movable fins between the channels.

10. The device according to claim 1, wherein at least one part of the inlet openings or outlet openings is covered by a screen.

11. A method for producing a three-dimensional object by a layer-by-layer application and selective solidification of a building material comprising the steps:
   a) application of a layer of a building material onto a working plane of a build surface;
   b) selective solidification of the layer of the building material at locations corresponding to respective cross-sections of the object to be produced; and
   c) repetition of steps a) and b), until the object is completed, wherein during the production of the object a gas flow is guided over the working plane from a side of the build surface to an opposite side of the build surface,
   the gas flow gas being generated through a nozzle element,
   the nozzle element comprising:
   a nozzle body with a gas inlet side and a gas outlet side, and a plurality of channels which extend through the body from the gas inlet side to the gas outlet side, with inlet openings on the gas inlet side and gas outlet openings on the gas outlet side, and which are separated by sidewalls, the gas channels having a length within the nozzle body and an outlet opening designed and dimensioned such that collectively the gas channels and the outlet openings yield a laminar gas flow that is formed in the nozzle which then is directed as a generally laminar gas flow across the build area in at least a vicinity of the nozzle gas outlet side, wherein a cross-sectional area of the channels increases gradually from the gas inlet side to the gas outlet side, the gas channels presenting outlet openings arranged in a matrix of at least two rows, with a first row along the length parallel to the side and a second row above the first row along the height perpendicular to the side, wherein a cross-sectional area of the channels increases gradually from the gas inlet side to the gas outlet side.

12. A nozzle element for purposes of introducing a gas flow into a device for producing a three-dimensional object, in particular into a device for producing a three-dimensional object by solidifying, layer-by-layer, building material at locations in a respective layer corresponding to the cross-section of the object to be produced, the device comprising:

a base on which the object is to be constructed, the base being on a vertically movable support within a build chamber;

a supply of building material;

an application device which receives building material from the supply and applies a layer of the building material onto the base in consecutive layers for selectively solidifying the building material layer by layer in a working plane of a build surface in the build chamber;

a solidifying device for purposes of selective solidification of the building material in an applied layer; a flow device generating a gas flow from a side of the build surface across an applied layer of the building material to an opposite side of the build surface;

a source of gas for the flow device, the nozzle element comprising:

an elongated nozzle body extending in a length along a side of the build surface and a height perpendicular to the side, with a gas inlet side and a gas outlet side; an installation or connection interface which is suitable for attaching the nozzle body adjacent a side of the build surface; and a plurality of separated gas channels which extend through the nozzle body from the gas inlet side to the gas outlet side, the gas channels having respective inlet openings on the gas inlet side and respective gas outlet openings on the gas outlet side, the gas channels having a length within the nozzle body and an outlet opening designed and dimensioned such that collectively the gas channels and the outlet openings yield a laminar gas flow that is formed in the nozzle element which is then directed as a generally laminar gas flow across the build surface at least in a vicinity of the nozzle gas outlet side, the gas channels presenting outlet openings arranged in a matrix of at least two rows, with a first row extending along the length parallel to the side of the build surface and a second row arranged above the first row along the height perpendicular to the side of the build surface, wherein a cross-sectional area of the channels increases gradually from the gas inlet side to the gas outlet side.

13. The nozzle element according to claim 12, wherein the installation or connection interface is designed such that the nozzle element can be attached, in a replaceable manner, onto the device for producing a three-dimensional object.

14. The nozzle element according to claim 12, wherein the gas channels are parallel.

\* \* \* \* \*